United States Patent
Shirakawa et al.

(10) Patent No.: US 9,933,061 B2
(45) Date of Patent: Apr. 3, 2018

(54) WELD STRUCTURE

(71) Applicant: FUJI JUKOGYO KABUSHIKI KAISHA, Tokyo (JP)

(72) Inventors: Yusuke Shirakawa, Tokyo (JP); Takuya Maekawa, Tokyo (JP); Hiroto Seto, Tokyo (JP); Takamasa Tsuchiya, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 39 days.

(21) Appl. No.: 15/249,012

(22) Filed: Aug. 26, 2016

(65) Prior Publication Data

US 2017/0089440 A1    Mar. 30, 2017

(30) Foreign Application Priority Data

Sep. 25, 2015   (JP) .................................. 2015-187949

(51) Int. Cl.
*F16H 48/40* (2012.01)
*B23K 15/00* (2006.01)
(Continued)

(52) U.S. Cl.
CPC ......... *F16H 48/40* (2013.01); *B23K 15/0006* (2013.01); *B23K 15/0073* (2013.01); *B23K 15/04* (2013.01); *B23K 26/211* (2015.10); *B23K 26/24* (2013.01); *B23K 26/28* (2013.01); *B23K 2201/008* (2013.01); *F16H 48/08* (2013.01); *F16H 2048/087* (2013.01); *F16H 2048/385* (2013.01)

(58) Field of Classification Search
None
See application file for complete search history.

(56) References Cited

U.S. PATENT DOCUMENTS

| | | | | |
|---|---|---|---|---|
| 2,651,216 A | * | 9/1953 | Alden | F16H 48/08 475/230 |
| 4,125,026 A | * | 11/1978 | Torii | F16H 48/08 29/893.1 |

(Continued)

FOREIGN PATENT DOCUMENTS

| | | |
|---|---|---|
| JP | 61-095796 A | 5/1986 |
| JP | 03-014066 A | 2/1991 |

(Continued)

OTHER PUBLICATIONS

Office Action received for Japanese Patent application No. 2015-187949, dated Jan. 10, 2017, 3 pages of Office action and 4 pages of English translation.

*Primary Examiner* — Colby M Hansen
(74) *Attorney, Agent, or Firm* — Chip Law Group

(57) ABSTRACT

A weld structure includes a fitting portion at which a first member and a second member are engaged, a weld portion at which the first member and the second member are welded together, and a space between the fitting portion and the weld portion. One of the first member and the second member has a communication passage whose one end is open to the space and whose other end is open to an outside at a position other than the space. The communication passage is blocked by an insertion member that has a predetermined function in addition to blocking the communication passage.

15 Claims, 5 Drawing Sheets

(51) Int. Cl.
    *B23K 15/04*     (2006.01)
    *F16H 48/08*     (2006.01)
    *B23K 26/211*     (2014.01)
    *B23K 26/24*     (2014.01)
    *B23K 26/28*     (2014.01)
    *B23K 101/00*     (2006.01)
    *F16H 48/38*     (2012.01)

(56) References Cited

U.S. PATENT DOCUMENTS

| | | | | |
|---|---|---|---|---|
| 4,793,211 A | * | 12/1988 | Schmidt | F16C 19/548 475/246 |
| 5,480,360 A | * | 1/1996 | Patzer | F16H 48/08 475/230 |
| 2008/0182702 A1 | * | 7/2008 | Donofrio | B60K 23/04 475/235 |
| 2014/0179482 A1 | | 6/2014 | Uchida et al. | |

FOREIGN PATENT DOCUMENTS

| | | |
|---|---|---|
| JP | 2010-174924 A | 8/2010 |
| JP | 2011-169444 A | 9/2011 |
| WO | 2011-089706 A1 | 7/2011 |
| WO | 2013/018223 A | 2/2013 |
| WO | 2013018223 A1 | 3/2015 |

\* cited by examiner

WELD STRUCTURE

CROSS-REFERENCE TO RELATED APPLICATIONS

The present application claims priority from Japanese Patent Application No. 2015-187949 filed on Sep. 25, 2015, the entire contents of which are hereby incorporated by reference.

BACKGROUND

1. Technical Field

The present invention relates to a weld structure that joins a first member and a second member by welding.

2. Related Art

A vehicle is equipped with a differential device, such as a front differential and a rear differential, which distributes a driving force output from an engine to corresponding left and right drive wheels when turning or the like. Also, as another form of the differential device, there is a center differential that distributes a driving force output from an engine to front and rear drive wheels. The differential device includes a differential ring gear to which a driving force is transmitted, and a differential case joined with the differential ring gear to rotate integrally with the differential ring gear. As a joining method of the differential ring gear and the differential case, there is a joining method by welding, in addition to a combining method by bolts or the like. For example, the differential ring gear and the differential case are joined, by performing beam welding to a position at which the differential ring gear made of carbon steel and the differential case made of cast iron are in contact with each other.

At the welding position of the differential ring gear and the differential case, a beam entering side is formed in a groove shape, and a space is formed at the back of the welding position at a beam distal end side. At the time of beam welding, a high energy beam is radiated while a filler wire is supplied to a groove, and penetration welding that causes melt metal to reach the space is performed. In this case, heat input at the time of welding increases the pressure in the space at the back of the welding position, and gas blows out from a part of the melt metal, and a defective hole opens in the weld portion in some cases. Hence, in order to reduce rise of the internal pressure of the space, there is a proposed differential device that is provided with a hole or a gutter that causes the space to communicate with outside (refer to Japanese Unexamined Patent Application Publication No. S61-95796, WO 2013/018223, and Japanese Unexamined Utility Model (Registration) Application Publication No. H3-14066).

Here, when the differential ring gear and the differential case are joined together, an outer circumferential portion of the differential case is press-fitted into an inner circumferential portion of the differential ring gear, and welding is performed to an abutting surface between the differential ring gear and the differential case, in order to maintain the precision of the differential ring gear. In this case, in order to prevent galling in the press fit surface, a gutter for gas releasing is not provided on the press fit surface, but it is necessary to provide a communication hole that communicate between the space and the outside.

However, when the communication hole that communicates between the space and the outside open to atmospheric air is provided, it is concerned that foreign objects, such as press fit powder generated at the time of press fit of the differential case and the differential ring gear and sputtered material generated at the time of welding, are ejected to the outside via the communication hole, after the differential device is installed in the transmission device. Such foreign objects get mixed into the inner portion of the transmission device as contaminants. In order to prevent ejection of such foreign objects, the communication hole needs to be blocked by the time when the differential device is installed in the transmission device at least, and therefore it is concerned that an additional process such as inserting a plug into the communication hole is necessary and that the production cost rises.

SUMMARY OF THE INVENTION

Thus, the present invention is made in consideration of the above problem, and it is desirable to provide a new and improved weld structure that can block the communication hole for gas releasing from the penetration space in which internal gas expands when welding, without increase of the assembly process and the production cost.

To overcome the above problem, an aspect of the present invention provides a weld structure including a fitting portion at which a first member and a second member are engaged, a weld portion at which the first member and the second member are welded together, and a space between the fitting portion and the weld portion. One of the first member and the second member has a communication passage whose one end is open to the space and whose other end is open to an outside at a position other than the space. The communication passage is blocked by an insertion member that has a predetermined function in addition to blocking the communication passage.

The communication passage may have an insertion hole into which the insertion member is inserted and a communication hole that communicates between the space and the insertion hole. An opening end of the communication hole that is open to an inner circumferential surface of the insertion hole may be closed by the insertion member.

The first member and the second member may be a differential case and a ring gear. The insertion member may be a retaining pin that prevents a pinion shaft for supporting a pinion gear from falling off. The communication passage may have an insertion hole into which the retaining pin is inserted, and a communication hole that communicates between the space and the insertion hole. The opening end of the communication hole that is open to the inner circumferential surface of the insertion hole may be closed by the retaining pin.

The first member and the second member may be a differential case and a ring gear. The insertion member may be a pinion shaft that supports a pinion gear. The communication passage may have a shaft insertion hole into which the pinion shaft is inserted, and a communication hole that communicates between the space and the shaft insertion hole. The opening end of the communication hole that is open to an inner circumferential surface of the shaft insertion hole may be closed by the pinion shaft.

The communication passage may have an insertion hole that is open to the space at one end, and into which the insertion member is inserted from the other end.

The first member and the second member may be a differential case and a ring gear. The insertion member may be a retaining pin that prevents a pinion shaft for supporting a pinion gear from falling off. The communication passage may be an insertion hole that is open to the space at one end, and into which the retaining pin is inserted from the other end.

The insertion member may be inserted into the communication passage, after the first member and the second member are welded together.

The weld portion may be formed by beam welding performed by supplying a filler wire, the beam welding being penetration welding that reaches the space.

DETAILED DESCRIPTION

Figure 1:
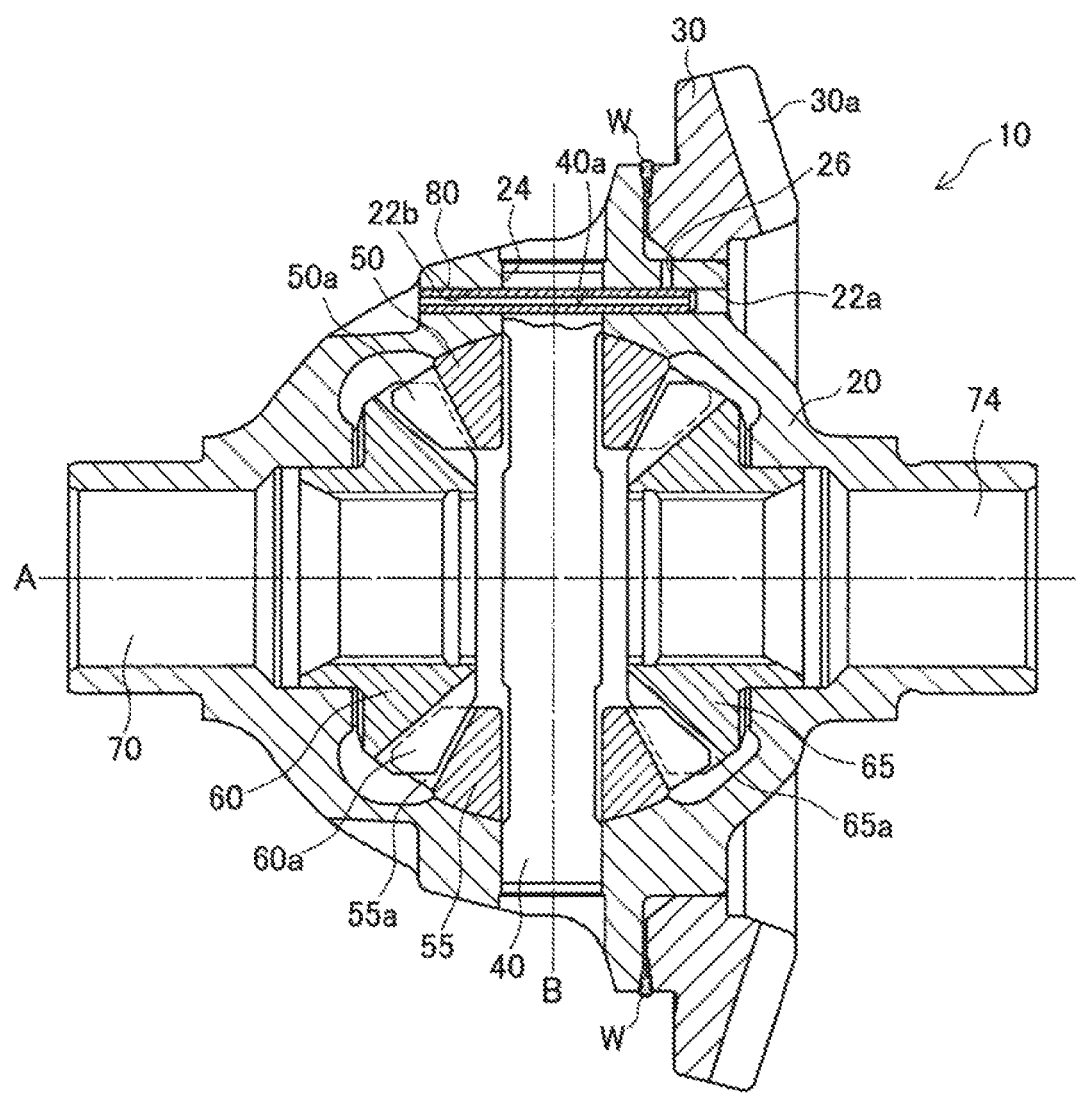
FIG. 1 is a cross-sectional view illustrating a differential device to which a weld structure according to a first implementation of the present invention is applied.

Hereinafter, preferred implementations of the present disclosure will be described in detail with reference to the appended drawings. Note that, in this specification and the appended drawings, structural elements that have substantially the same function and structure are denoted with the same reference numerals, and repeated description of these structural elements is omitted.

1. First Implementation (1-1. Basic Configuration of Differential Device)

First, a basic configuration of a differential device to which a weld structure according to a first implementation of the present invention is applied will be described. The following description will describe an example in which the weld structure according to the present implementation is applied to a weld portion between a differential case in a differential device and a differential ring gear. In one implementation, the differential case may serve as a "first member". In one implementation, the differential ring gear may serve as a "second member". FIG. 1 is a cross-sectional view illustrating an example of a configuration of a differential device 10. In FIG. 1, a cross section including a rotation axis line A of a differential case 20 and a differential ring gear 30 and a rotation axis line B of a pinion bevel gear 50 is illustrated. For example, such a differential device 10 is installed in a transmission device of a vehicle, and is used as a differential gear device that distributes driving force output from an internal-combustion engine to left and right drive wheels.

The differential device 10 according to the present implementation includes a differential case 20, a differential ring gear 30, a pinion shaft 40, pinion bevel gears 50, 55, and side bevel gears 60, 65. The differential case 20 as the first member is supported in an axially rotatable manner about a center at the rotation axis line A, in the housing (not depicted). On an outer circumferential portion of the differential case 20, an inner circumferential portion of the differential ring gear 30 as the second member is engaged, and the differential case 20 and the differential ring gear 30 are welded together at weld portions W. A tooth surface 30a of the differential ring gear 30 meshes with a tooth surface of the pinion gear that is provided integrally with a propeller shaft (not depicted), and driving force from the internal-combustion engine is transmitted to the differential ring gear 30 via the propeller shaft. Thereby, the differential case 20 is driven and rotated axially about a center at the rotation axis line A, by the driving force from the internal-combustion engine.

In the differential case 20, the pinion shaft 40 having the axis line B along the direction that is orthogonal to the rotation axis line A is supported. The pinion shaft 40 is inserted into a shaft support hole 24 provided in the differential case 20. Pin insertion holes 22a, 22b are formed in the differential case 20, and a pin insertion hole 40a is formed in the pinion shaft 40. A retaining pin 80 is press-fitted so as to penetrate these pin insertion holes 22a, 22b, 40a, and the pinion shaft 40 is prevented from falling off the differential case 20. As the retaining pin 80, a fitted pin having a cross section of a C shape can be used, for example.

In the pinion shaft 40, a pair of the pinion bevel gears 50, 55 are supported in axially rotatable manner about a center at the pinion shaft 40. The pair of the pinion bevel gears 50, 55 are disposed at both sides that sandwiches the rotation axis line A. The pair of the pinion bevel gears 50, 55 each axially rotate about a center at the rotation axis line B that is orthogonal to the rotation axis line A.

Note that, in the differential device 10 illustrated in FIG. 1, the pair of the pinion bevel gears 50, 55 are supported on one pinion shaft 40, but a pinion shaft may be provided for each of the pinion bevel gears 50, 55. In that case, two or more sets of pinion bevel gears and pinion shafts may be provided.

Tooth surfaces 60a, 65a of a pair of left and right side bevel gears 60, 65 mesh with tooth surfaces 50a, 55a of the pair of the pinion bevel gears 50, 55, respectively. The side bevel gear 60 of the drawing left side engages, by using a spline, with a drive shaft (axle drive shaft) (not depicted) that rotationally drives a left drive wheel, and the side bevel gear 65 of the drawing right side engages, by using a spline, with a drive shaft (axle drive shaft) (not depicted) that rotationally drives a right drive wheel. The left and right drive shafts are supported in drive shaft support holes 70, 74 provided in the differential case 20 in an axially rotatable manner.

A pair of the side bevel gears 60, 65 axially rotate about a center at the common rotation axis line A with the differential case 20, by the driving force of the internal-combustion engine transmitted via the differential ring gear 30, the differential case 20 and the pinion bevel gears 50, 55. All of the differential case 20, the differential ring gear 30, the side bevel gears 60, 65, and the drive shafts (the axle drive shafts) (not depicted) can axially rotate about a center at the rotation axis line A. Also, the pinion bevel gears 50, 55 can axially rotate about a center at the rotation axis line B, and can orbit about a center at the rotation axis line A. The differential case 20 and the side bevel gears 60, 65, and the pinion bevel gears 50, 55 and the side bevel gears 60, 65 are rotatable relatively.

When the driving force is transmitted from the internal-combustion engine to the differential ring gear 30, the differential case 20 axially rotates about a center at the rotation axis line A, and the pair of the pinion bevel gears 50, 55 supported by the pinion shaft 40 fixed to the differential case 20 also orbit around the rotation axis line A. When there is no rotation difference between the left and right drive wheels (when the vehicle travels straight, etc.), the differential device 10 transmits the driving force evenly to the pair of the left and right side bevel gears 60, 65. In this case, the rotation speeds of the pair of the left and right side bevel gears 60, 65 are equal to each other, and thus the pinion bevel gears 50, 55 orbit about a center at the rotation axis line A, without axially rotating about a center at the rotation axis line B.

On the other hand, when there is a rotation difference between the left and right drive wheels (when the vehicle turns, etc.), the differential device 10 appropriately distributes the driving force to the pair of the left and right side bevel gears 60, 65. For example, when the vehicle turns to the left, and the rotation speed of the right drive wheel is larger than the left drive wheel, the side bevel gear 65 engaged with the drive shaft of the right drive wheel rotates faster than the differential case 20, and the side bevel gear 60 engaged with the drive shaft of the left drive wheel rotates slower than the differential case 20. In this case, the pinion bevel gears 50, 55 axially rotates about a center at the rotation axis line B while orbiting about a center at the rotation axis line A, and the rotation speed difference between the left and right drive wheels is absorbed.

In the differential device 10, the differential ring gear 30, the pinion bevel gears 50, 55, and the side bevel gears 60, 65 are formed of carbon steel for example, to maintain the precision of meshing of the tooth surfaces. Also, the differential case 20 is formed of cast iron, for example. Note that, when the differential device 10 is a center differential that distributes the driving force to the front and rear drive shafts, the side bevel gears 60, 65 are engaged with the front drive shaft and the rear drive shaft respectively.

(1-2. Weld Structure)

Next, a weld structure according to the present implementation will be described in detail. As described above, the differential case 20 and the differential ring gear 30 of the differential device 10 illustrated in FIG. 1 are joined by welding. The weld structure according to the present implementation can be applied to the weld structure of the differential case 20 and the differential ring gear 30.

Figure 2:
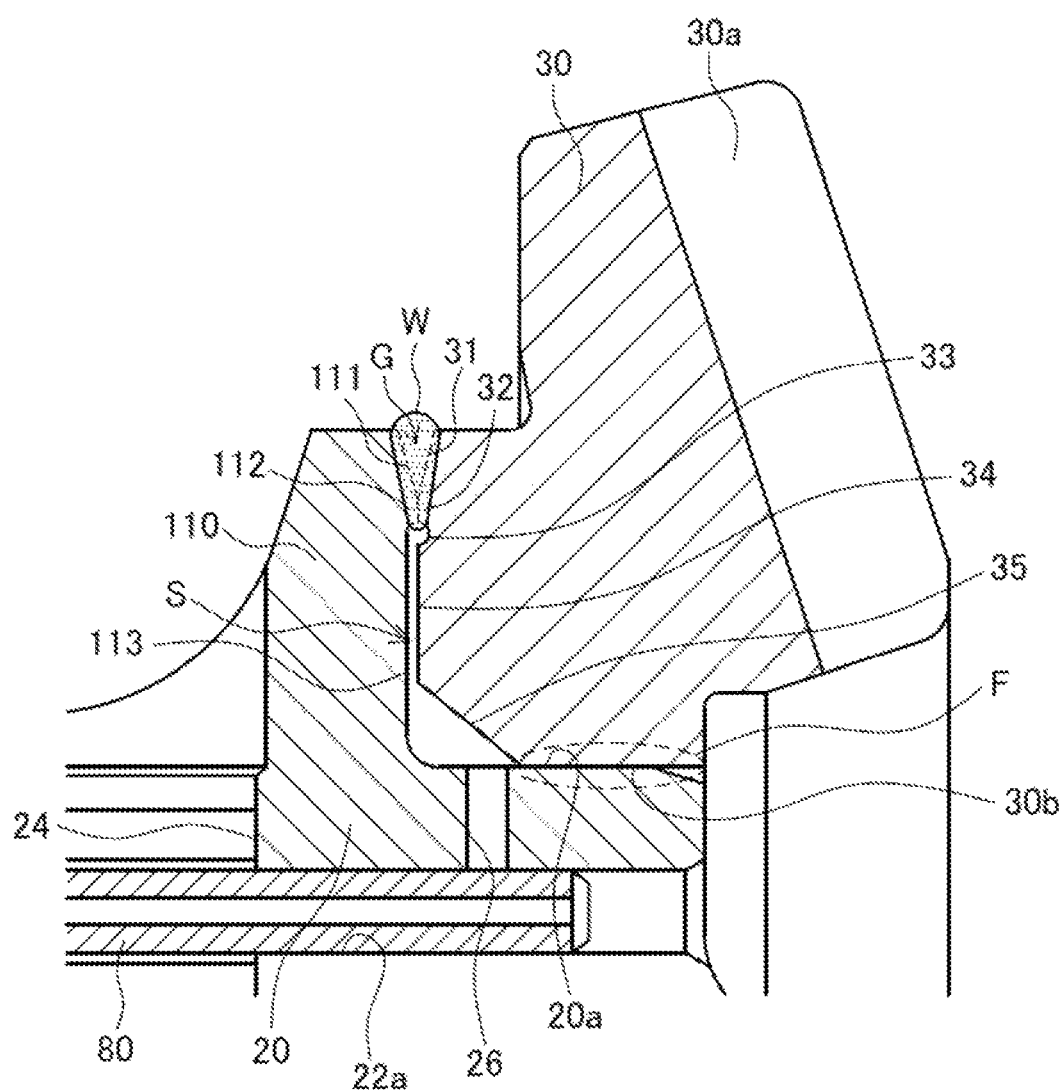
FIG. 2 is a cross-sectional view illustrating a circumference of a joining part of a weld structure according to the implementation.

FIG. 2 illustrates an area surrounding a joining part between the differential case 20 and the differential ring gear 30, in the differential device 10 illustrated in FIG. 1, in an enlarged manner. In this FIG. 2, in the weld portion W, shapes of the differential ring gear 30 and the differential case 20 (a flange 110) before welding are illustrated with dotted lines. An outer circumferential portion 20a of the differential case 20 is engaged with, and is press-fitted into, the inner circumferential portion 30b of the differential ring gear 30. When the differential ring gear 30 is installed on the differential case 20, the differential ring gear 30 is fitted onto the differential case 20 from the right side in FIG. 2, so that the differential ring gear 30 is in contact with the flange 110 of the differential case 20. A fitting portion F between the differential case 20 and the differential ring gear 30 is formed over whole circumference.

The differential ring gear 30 includes a slope portion 31, a contacting portion 32, a space formation recessed portion 33, a flat portion 34, and a chamfer portion 35, in order from the outer circumference side, at a part that faces the flange 110 of the differential case 20. The slope portion 31 is formed as a surface that gets away from the flange 110 as it gets away to the outer circumference side from the contacting portion 32. Also, the contacting portion 32 and the flat portion 34 can be surfaces that exist on a common plane, for example. The space formation recessed portion 33 is provided between the contacting portion 32 and the flat portion 34, and is formed as a gutter that is recessed to a direction that gets away from the flange 110.

Also, the flange 110 of the differential case 20 includes a slope portion 111, a contacting portion 112, and a space formation recessed portion 113, in order from the outer circumference side, at a part that faces the differential ring gear 30. The slope portion 111 is formed as a surface that gets away from the differential ring gear 30 as it gets away to the outer circumference side from the contacting portion 112. Also, the space formation recessed portion 113 is provided at the more inner circumferential side than the contacting portion 112, and is formed as a gutter that is recessed to a direction that gets away from the differential ring gear 30.

Also, the differential case 20 is a surface that extends continuously to the outer circumferential portion 20a that engages with the inner circumferential portion 30b of the differential ring gear 30, and includes a communication hole 26 that is open to a surface that faces the chamfer portion 35 of the differential ring gear 30. Another end of the communication hole 26 is open to the inner circumferential surface of the pin insertion hole 22a into which the retaining pin 80 for preventing the pinion shaft 40 from falling off is press-fitted. An opening end of the communication hole 26 that is open to the inner circumferential surface of the pin insertion hole 22a is disposed at a position in which the retaining pin 80 can be inserted in a state in which the differential device 10 is assembled. That is, the communication hole 26 is in communication with the outside of the differential case 20 via the pin insertion hole 22a before the retaining pin 80 is press-fitted, and is blocked by the outer circumferential surface of the retaining pin 80 after the retaining pin 80 is press-fitted.

In a state in which the outer circumferential portion 20a of the differential case 20 is press-fitted into the inner circumferential portion 30b of the differential ring gear 30, and the contacting portion 32 of the differential ring gear 30 and the contacting portion 112 of the differential case 20 are in contact with each other, a groove G is formed by the slope portions 31, 111 that are formed in the differential ring gear 30 and the flange 110 respectively. Also, in this state, a penetration space S is formed by the space formation recessed portions 33, 113 that are formed in the differential ring gear 30 and the flange 110 respectively.

When the differential case 20 and the differential ring gear 30 are welded together, a filler wire is supplied to the groove G, while a beam of a high energy such as laser and electron beam is radiated from the outer circumference side, and the filler wire and the contacting portions 32, 112 melts, so that the differential ring gear 30 and the differential case 20 are welded together. In this case, a beam is radiated in such a manner melting metal formed by melting the filler wire and the contacting portions 32, 112 reaches the penetration space S, in order to perform penetration welding. The weld portion W between the differential case 20 and the differential ring gear 30 and the above penetration space S are formed over the whole circumference.

Here, at the time of manufacturing of the differential device 10, the differential case 20 and the differential ring gear 30 is joined together before the pinion shaft 40 and the pinion bevel gears 50, 55 are installed in the differential case 20. In other words, in a stage in which the differential case 20 and the differential ring gear 30 are welded together, the retaining pin 80 for preventing the pinion shaft 40 from falling off is not press-fitted into the pin insertion hole 22a. Thus, when the differential case 20 and the differential ring gear 30 are welded together, the penetration space S is open to the outside via the communication hole 26 and the pin insertion hole 22a. That is, the communication hole 26 and the pin insertion hole 22a serve as a communication passage that communicates between the penetration space S and the outside of the differential case 20, before the press fit of the retaining pin 80. Such a communication passage is blocked by the retaining pin 80 after the press fit of the retaining pin 80, and the penetration space S becomes a blocked space.

Figure 3:
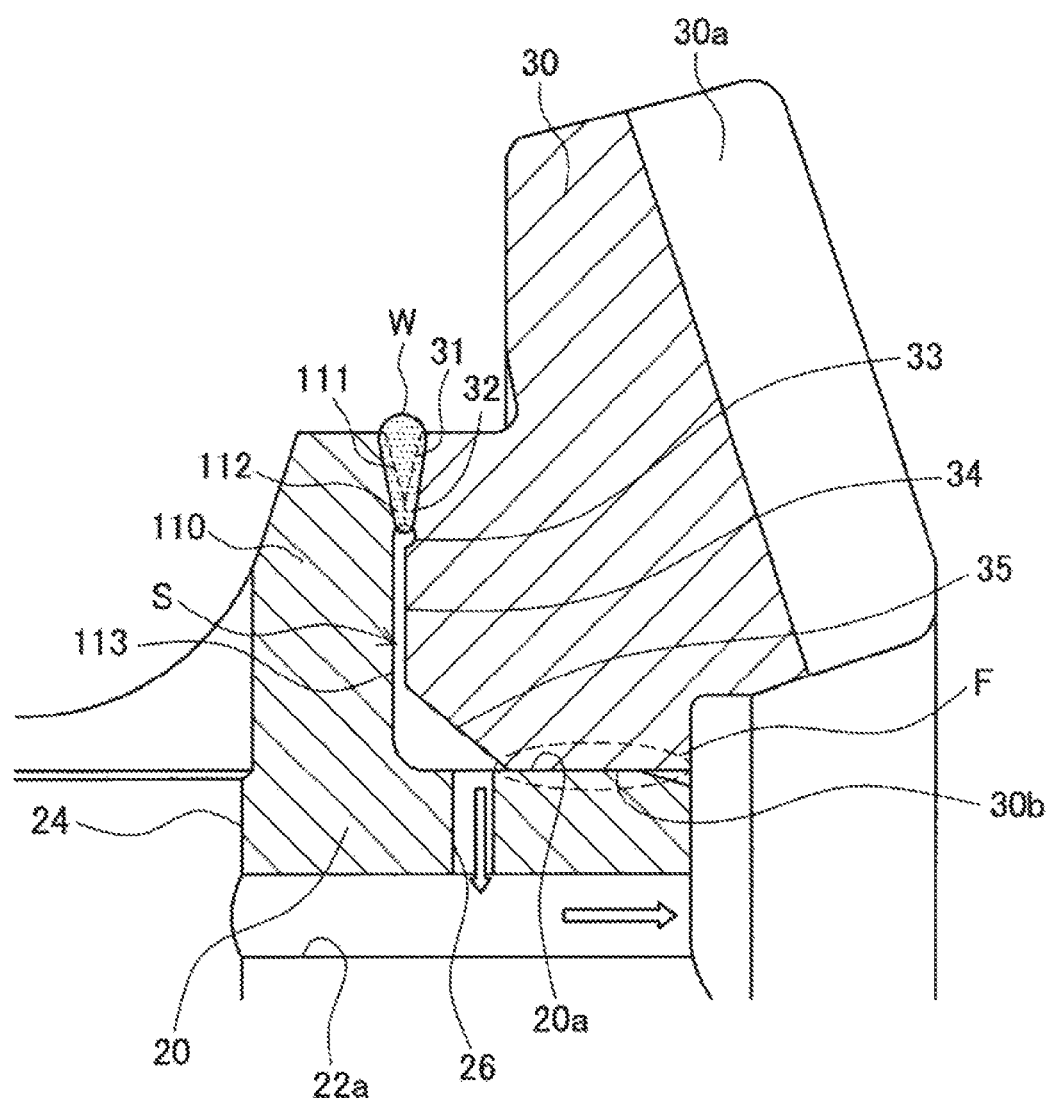
FIG. 3 is an explanatory diagram illustrating a situation in which a gas is released when welding.

When the above penetration welding is performed, the gas in the penetration space S expands by supplied heat or generated heat. When the penetration space S is not open to the outside, the pressure in the penetration space S rises due to expansion of the gas in the penetration space S, and the gas blows out from a part of the melting metal of the weld portion W, and a defective hole opening in the melting portion W occurs. In the weld structure according to the present implementation, when the differential case 20 and the differential ring gear 30 are welded together, the penetration space S is open to the outside via the communication hole 26 and the pin insertion hole 22a. Thus, as illustrated in FIG. 3, the gas that expands in the penetration space S is released to the outside of the differential case 20 via the communication hole 26 and the pin insertion hole 22a. Thereby, the rise of the pressure in the penetration space S is reduced, and the defective hole opening in the melting portion W can be prevented.

The cross sectional shape and the cross-sectional area of the communication hole 26 and the number of communication holes 26 are not limited particularly, as long as the gas is ejected from the penetration space S when the differential case 20 and the differential ring gear 30 are welded together. Note that the cross sectional shape may be a circle, to facilitate a hole opening process. Also, if the number of the communication holes 26 is too many, and the cross-sectional area of the communication hole 26 is too large, it is concerned that a reaction force decreases which is exerted on the melting portion W from the penetration space S side to prevent falling of the melting portion W when welding, thereby decreasing the weldability. Thus, for example, one communication hole 26 having a diameter of approximately 1 to 5 mm may be provided.

Also, in the weld structure according to the present implementation, the penetration space S is a blocked space by the retaining pin 80, in a state in which the differential device 10 is assembled and installed in the transmission device (refer to FIG. 2). Thus, foreign objects, such as press fit powder and sputtered material, which are generated at the time of press fit and beam welding of the differential case 20 and the differential ring gear 30 and exist in the penetration space S can be prevented from being ejected to the outside of the differential device 10. Thereby, the foreign objects such as these press fit powder and the sputtered material can be prevented from getting mixed in the inner portion of the transmission device as contaminants.

Also, in the weld structure according to the present implementation, the communication passage formed by the communication hole 26 and the pin insertion hole 22a is blocked by the retaining pin 80 for preventing the pinion shaft 40 from falling off, and an additional plug or the like is not utilized to block the communication passage. Thus, it is needless to provide an additional process, and the production cost does not increase.

(1-3. Exemplary Variant)

In the above, an example of the weld structure according to the present implementation has been described, but the weld structure can be modified variously. In the following, one exemplary variant of the weld structure will be described.

Figure 4:
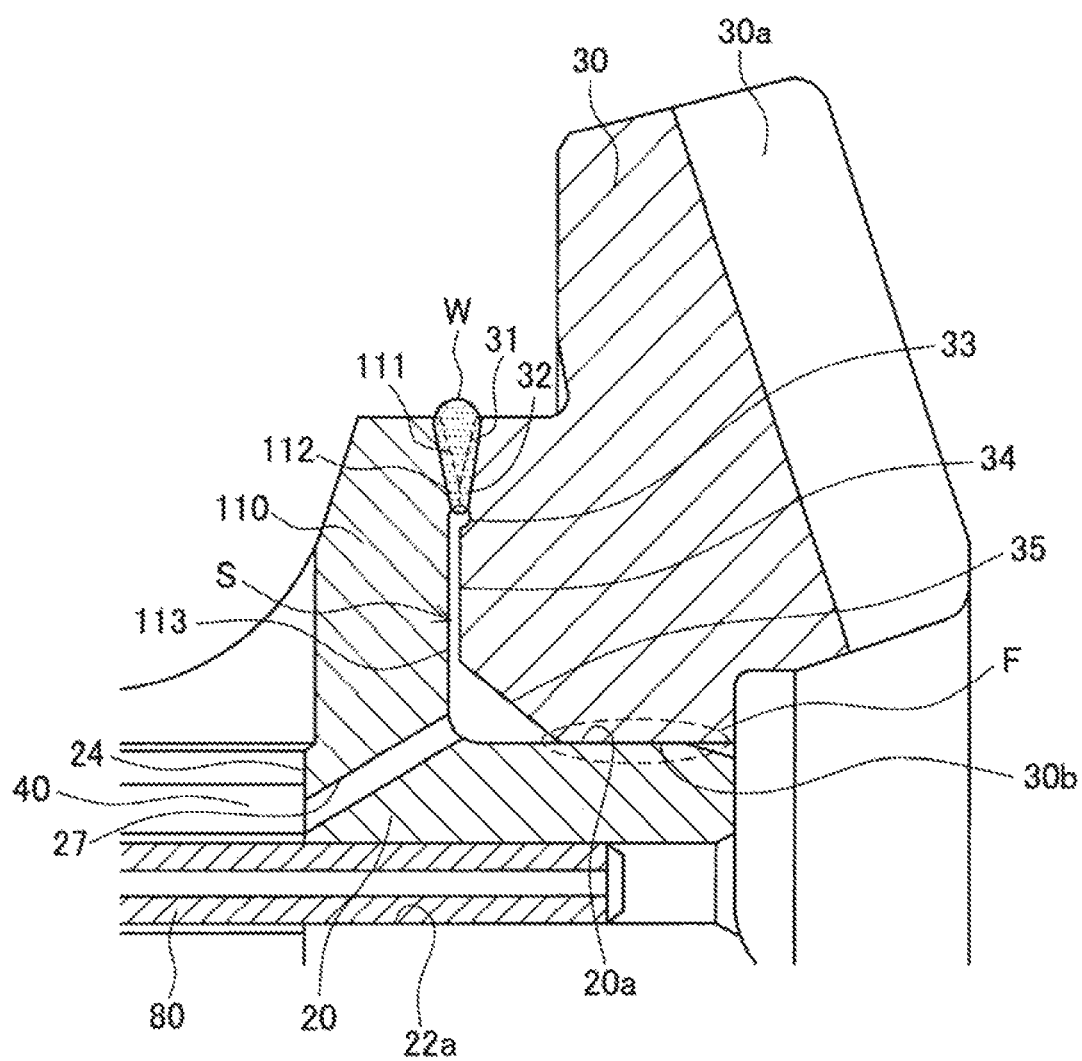
FIG. 4 is an explanatory diagram illustrating an exemplary configuration of a weld structure according to an exemplary variant of the implementation.

FIG. 4 is a cross-sectional view illustrating a weld structure according to an exemplary variant, and illustrates an area surrounding a joining part between the differential case 20 and the differential ring gear 30 in an enlarged manner. In the weld structure according to above the implementation, the communication hole 26 that communicates between the penetration space S and the pin insertion hole 22a into which the retaining pin 80 is press-fitted is provided, but in the weld structure according to the exemplary variant, a communication hole 27 that communicates between the penetration space S and the shaft support hole 24 into which the pinion shaft 40 is inserted is provided.

At the time of manufacturing of the differential device 10, the differential case 20 and the differential ring gear 30 are welded together, before the pinion shaft 40 is inserted into the shaft support hole 24. Thus, when the differential case 20 and the differential ring gear 30 are welded together, the penetration space S is open to the outside via the communication hole 27 and the shaft support hole 24. That is, the communication hole 27 and the shaft support hole 24 serve as a communication passage that communicates between the penetration space S and the outside of the differential case 20 before the insertion of the pinion shaft 40. Also, the communication passage is blocked by the pinion shaft 40, after the insertion of the pinion shaft 40, and the penetration space S becomes a blocked space.

Thus, when the differential case 20 and the differential ring gear 30 are welded together, the gas that expands in the penetration space S is released to the outside of the differential case 20 via the communication hole 27 and the shaft support hole 24. Thereby, the rise of the pressure in the penetration space S is reduced, and the defective hole opening in the melting portion W can be prevented. On the other hand, in a state in which the differential device 10 is assembled and installed in the transmission device, the penetration space S is blocked, and foreign objects such as press fit powder and sputtered material that exist in the penetration space S can be prevented from being ejected to the outside of the differential device 10. Thereby, the foreign objects such as the press fit powder and the sputtered material can be prevented from getting mixed in the inner portion of the transmission device as contaminants.

Also, in the weld structure according to the exemplary variant, the communication passage formed by the communication hole 27 and the shaft support hole 24 is blocked by the pinion shaft 40, and an additional plug or the like is not utilized to block the communication passage. Thus, it is needless to provide an additional process, and the production cost does not increase.

2. Second Implementation

Next, a weld structure according to a second implementation of the present invention will be described. The weld structure according to the present implementation is also a differential device mounted in a vehicle, and a basic configuration of the differential device according to the present implementation is the same as the differential device 10 described in the first implementation. In the following, the weld structure according to the present implementation will be mainly described with regard to different points from the weld structure according to the first implementation.

Figure 5:
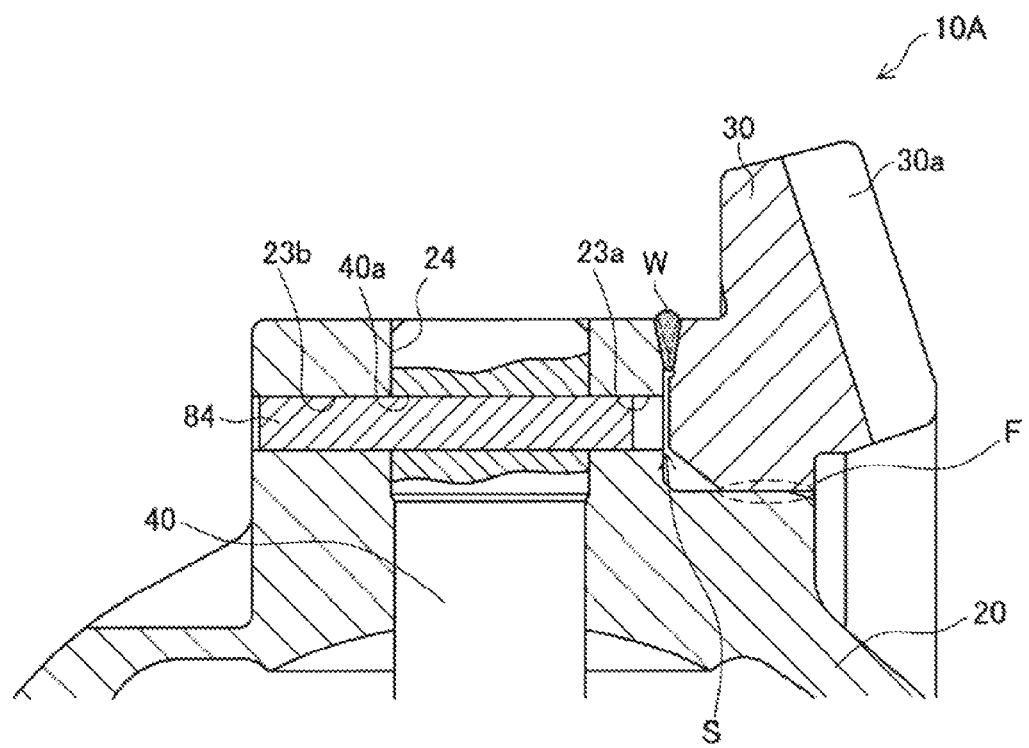
FIG. 5 is an explanatory diagram illustrating an exemplary configuration of a weld structure according to a second implementation.

FIG. 5 is a cross-sectional view illustrating the weld structure according to the present implementation, and illustrates a part of the differential device 10A including the joining part between the differential case 20 and the differential ring gear 30. In the differential device 10A according to the present implementation, a retaining pin 84 for preventing the pinion shaft 40 from falling off is press-fitted so as to penetrate the pin insertion hole 40a provided in the pinion shaft 40 and pin insertion holes 23a, 23b provided in the differential case 20. The retaining pin 80 that is utilized here is not a fitted pin having a cross section of C shape, but is a press fit pin that does not have an inner hole. The pin insertion hole 23a provided in the differential case 20 is open to the penetration space S directly at one end, and is open to the inner circumferential surface of the shaft support hole 24 at another end.

At the time of manufacturing of the differential device 10A, the differential case 20 and the differential ring gear 30 are welded together, before the pinion shaft 40 is installed in the differential case 20. That is, when the differential case 20 and the differential ring gear 30 are welded together, the retaining pin 84 is not press-fitted into the pin insertion hole 23a, and the pinion shaft 40 is not inserted into the shaft support hole 24. Thus, when the differential case 20 and the differential ring gear 30 are welded together, the penetration space S is open to the outside via the pin insertion hole 23a and the shaft support hole 24. The pin insertion hole 23a and the shaft support hole 24 serve as a communication passage that communicates between the penetration space S and the outside of the differential case 20. Also, the communication passage is blocked by the retaining pin 84 after the retaining pin 84 is inserted into the pin insertion hole 23a, and the penetration space S becomes a blocked space.

Thus, when the differential case 20 and the differential ring gear 30 are welded together, the gas that expands in the penetration space S is released to the outside of the differential case 20 via the pin insertion hole 23a and the shaft support hole 24. Thereby, the rise of the pressure in the penetration space S is reduced, and the defective hole opening in the melting portion W can be prevented. On the other hand, in a state in which the differential device 10A is assembled and installed in the transmission device, the penetration space S is blocked, and foreign objects such as press fit powder and sputtered material which exist in the penetration space S can be prevented from being ejected to the outside of the differential device 10A. Thereby, the foreign objects such as the press fit powder and the sputtered material can be prevented from getting mixed in the inner portion of the transmission device as contaminants.

Also, in the weld structure according to the present implementation, the communication passage formed by the pin insertion hole 23a and the shaft support hole 24 is blocked by the retaining pin 84, and an additional plug or the like is not utilized to block the communication passage. Thus, it is needless to provide an additional process, and the production cost does not increase.

3. Conclusion

As described above, the weld structure according to each of the above implementations includes a communication passage that communicates between the penetration space S formed between the fitting portion F and the weld portion W to the outside, when the differential case 20 and the differential ring gear 30 are welded together. Thus, when the differential case 20 and the differential ring gear 30 are welded together, the gas in the penetration space S which expands by supplied heat or generated heat is released to the outside via the communication passage. Thereby, the rise of the internal pressure of the penetration space S is reduced, and a defective hole opening in the melting portion W is prevented.

Also, the above communication passage is blocked by the pinion shaft 40 or the retaining pins 80, 84 that are press-fitted or inserted into the communication passage, after the installation of the differential devices 10, 10A, and the penetration space S becomes a blocked space. Thereby, after the differential devices 10, 10A are installed in the transmission device, the foreign objects such as the press fit powder and the sputtered material are ejected outside the differential devices 10, 10A from the penetration space S, and are not mixed in the transmission device as contaminants.

Then, the retaining pins 80, 84 and the pinion shaft 40 for blocking the above communication passage have a function for preventing the pinion shaft 40 from falling off and a function for supporting the pinion bevel gears 50, 55 respectively, and are not provided additionally to block the communication passage. Thus, in the production process of the differential device 10, the communication passage for gas releasing from the penetration space S can be blocked, without increasing the additional assembly process and the production cost.

Although the preferred implementations of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

For example, in the above implementation, an example in which a communication passage for gas releasing is provided at the differential case 20 side has been described, but the present invention is not limited to such an example. For example, when an insertion hole into which an insertion member having another function is inserted is provided at the differential ring gear 30 side, a communication hole that communicates between the insertion hole and the penetration space S may be formed, and a communication passage for gas releasing may be provided at the differential ring gear 30 side.

Also, in the above implementation, an example in which the weld structure according to the implementation of the present invention is applied to the differential device has been described, but the present invention is not limited to such an example. The weld structure according to the implementation of the present invention is applicable to another structural object, if the weld structure includes a space in which internal gas can expand by heat at the time of welding such as beam welding. In this case, the configuration may be such that an insertion hole into which an insertion member having another function is inserted exists at a position in communication via a communication hole from a space in the first member or the second member, and the insertion member is inserted into the insertion hole after a welding process between the first member and the second member. For example, the weld structure according to the implementation of the present invention may be applied to a differential device with a limited-slip differential mechanism.

The invention claimed is:
1. A weld structure applicable to a differential device to be mounted in a vehicle, the weld structure comprising:

a fitting portion at which a first member and a second member are engaged, a weld portion at which the first member and the second member are welded together, and a space between the fitting portion and the weld portion, wherein one of the first member and the second member has a communication passage whose first end is open to the space and whose second end is open to an outside at a position other than the space, and the communication passage is blocked by an insertion member that has a function in addition to a blocking function that blocks the communication passage, wherein the insertion member is inserted into the communication passage, after the first member and the second member are welded together.

2. The weld structure according to claim 1, wherein the communication passage has an insertion hole into which the insertion member is inserted and a communication hole that communicates between the space and the insertion hole, and an opening end of the communication hole that is open to an inner circumferential surface of the insertion hole is closed by the insertion member.

3. The weld structure according to claim 2, wherein the first member and the second member are a differential case and a ring gear, the insertion member is a retaining pin that prevents a pinion shaft that supports a pinion gear from falling off, the communication passage has an insertion hole into which the retaining pin is inserted, and a communication hole that communicates between the space and the insertion hole, and the opening end of the communication hole that is open to the inner circumferential surface of the insertion hole is closed by the retaining pin.

4. The weld structure according to claim 3, wherein the weld portion is provided by beam welding process that utilizes a supplied filler wire, where the beam welding process is a penetration welding process that reaches the space.

5. The weld structure according to claim 2, wherein the first member and the second member are a differential case and a ring gear, the insertion member is a pinion shaft that supports a pinion gear, the communication passage has a shaft insertion hole into which the pinion shaft is inserted, and a communication hole that communicates between the space and the shaft insertion hole, and the opening end of the communication hole that is open to an inner circumferential surface of the shaft insertion hole is closed by the pinion shaft.

6. The weld structure according to claim 5, wherein the weld portion is provided by beam welding process that utilizes a supplied filler wire, where the beam welding process is a penetration welding process that reaches the space.

7. The weld structure according to claim 2, wherein the weld portion is provided by beam welding process that utilizes a supplied filler wire, where the beam welding process is a penetration welding process that reaches the space.

8. The weld structure according to claim 1, wherein the communication passage has an insertion hole that is open to the space at the first end, and into which the insertion member is inserted from the second end.

9. The weld structure according to claim 8, wherein the first member and the second member are a differential case and a ring gear, the insertion member is a retaining pin that prevents a pinion shaft that supports a pinion gear from falling off, and the communication passage is an insertion hole that is open to the space at the first end, and into which the retaining pin is inserted from the second end.

10. The weld structure according to claim 9, wherein the weld portion is provided by beam welding process that utilizes a supplied filler wire, where the beam welding process is a penetration welding process that reaches the space.

11. The weld structure according to claim 9, wherein the weld portion is provided by beam welding process that utilizes a supplied filler wire, where the beam welding process is a penetration welding process that reaches the space.

12. The weld structure according to claim 8, wherein the weld portion is provided by beam welding process that utilizes a supplied filler wire, where the beam welding process is a penetration welding process that reaches the space.

13. The weld structure according to claim 1, wherein the first member comprises and insertion hole that receives the insertion member is capable of being inserted after the first member and the second member are welded together, at least a part of the insertion hole constituting the communication passage, and the communication passage is blocked by insertion of the insertion member into the insertion hole.

14. The weld structure according to claim 1, wherein the weld portion is provided by beam welding process that utilizes a supplied filler wire, where the beam welding process is a penetration welding process that reaches the space.

15. A method of manufacturing a weld structure applicable to a differential device to be mounted in a vehicle, the weld structure comprising a fitting portion at which a first member and a second member are engaged, a weld portion at which the first member and the second member are welded together, and a space between the fitting portion and the weld portion, wherein one of the first member and the second member has a communication passage whose first end is open to the space and whose second end is open to an outside at a position other than the space, and after the first member and the second member are welded together, the communication passage is blocked by inserting an insertion member into the communication passage, wherein the insertion member that having a function in addition to a blocking function that blocks the communication passage.

* * * * *